United States Patent Office 3,716,574
Patented Feb. 13, 1973

3,716,574
PURE CRYSTALLINE PLICATIC ACID TETRAHYDRATE AND THE METHYL ESTER THEREOF
John Howard and Terence D. McIntosh, Vancouver, British Columbia, Canada, assignors to Rayonier Incorporated, New York, N.Y.
No Drawing. Filed Dec. 1, 1967, Ser. No. 687,092
The portion of the term of the patent subsequent to Feb. 22, 1989, has been disclaimed
Int. Cl. C07c 65/14, 69/76
U.S. Cl. 260—473 F         2 Claims

ABSTRACT OF THE DISCLOSURE

Pure crystalline plicatic acid tetrahydrate that is stable to heat and light up to its melting point of 176° C. is prepared from substantially pure methyl plicatate. The pure methyl plicatate, which is itself a new composition of matter conveniently prepared from an aqueous extract of red cedar heartwood, is saponified with an aqueous solution of alkali metal hydroxide at an elevated temperature under substantially non-oxidative conditions. The resulting alkali metal plicatate solution is then acidified with a slight excess of a mineral acid such as hydrochloric or sulfuric acid, and the acidified solution is cooled, and if desired seeded, whereupon pure crystalline plicatic acid tetrahydrate precipitates in yields as high as 80 or 90 percent of theoretical.

BACKGROUND OF THE INVENTION

Plicatic acid is one of the principal components found in the complex mixture of phenolic compounds present in the aqueous extract of western red cedar heartwood. This acid was first isolated by J. A. F. Gardner, G. M. Barton and Harold MacLean [Can. J. Chem. 37, 1703–9 (1959)] who obtained it as an anhydrous amorphous powder with properties quite different from the crystalline product obtained by the present process. The structure was establish by J. A. F. Gardner, E. P. Swan, S. A. Sutherland and Harold MacLean [Can. J. Chem. 44, 52–8 (1966)] through preparation and analysis of crystalline derivatives. As a result of this work plicatic acid is understood to have the empirical formula $C_{20}H_{22}O_{10}$ and to be represented by the following structural formula:

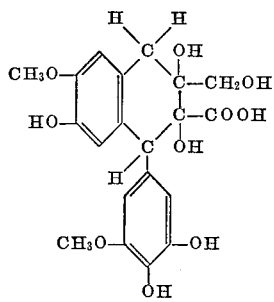

Three methods used by Gardner and his co-workers to separate and recover plicatic acid from an aqueous extract of red cedar heartwood involved (a) precipitation of a lead salt, (b) column chromatography and (c) countercurrent distribution with ethyl acetate and water. In each case an anhydrous, tan colored powder was obtained that was very soluble in cold water. This product was unstable when exposed to sunlight, turning dark red brown, and on heating of either the solid or an aqueous solution thereof it gradually converted into the lactone derivative of the acid. Finally, Gardner et al. found their plicatic acid product to be laevorotary in water, i.e., $(\alpha)_D^{21} = -9.99°$.

Gardner et al. postulated that their plicatic acid would have utility as an antioxidant and as an intermediary for or constituent of pharmaceutical products. It is apparent, however, that a light and heat unstable, amorphous product having the overall properties of the Gardner et al. plicatic acid powder would not be attractive as a production line chemical, particularly for pharmaceutical and other such uses that normally require maximum stability, purity and reproducibility.

SUMMARY OF THE INVENTION

As a result of an intensive investigation we have discovered a simple process for the production of plicatic acid in pure form that is commercially more attractive than the product previously described. We have found that a pure crystalline ester of plicatic acid can be obtained directly from a crude aqueous extract of western red cedar heartwood and that the pure ester can then be readily saponified to yield pure crystalline plicatic acid tetrahydrate. Both the ester and the plicate acid tetrahydrate are new compositions of matter.

In the preferred embodiment of our invention, the aqueous extract of western red cedar wood is dried to remove substantially all water therefrom. The dried extract is then dissolved in methanol containing a minor amount of a concentrated mineral acid catalyst whereby the plicatic acid content of the extract is converted to methyl plicatate. Crystals of substantially pure methyl plicatate are precipitated from the methanolic solution in the manner hereinafter described, and the desired pure methyl plicatate product is recovered therefrom.

The pure methyl plicatate is dissolved in an aqueous solution of an alkali metal hydroxide to obtain an aqueous solution of saponified methyl plicatate. The plicatate-containing solution is then treated with a mineral acid, such as surfuric acid or hydrochloric acid, to convert the alkali metal plicatate contents of the solution to plicatic acid. The acidified solution is then cooled to precipitate crystals of pure plicatic acid therefrom, and the pure crystalline product is then washed and recovered.

The plicatic acid tetrahydrate product obtained by the practice of our invention is a white crystalline material which has the empirical formula $C_{20}H_{22}O_{10} \cdot 4H_2O$. The crystals have a melting point of 176° C. (Leitz hot stage melting point apparatus) and are stable when exposed to heat and light up to said melting point. They are very soluble in hot water (>50 grams/100 ml. at 100° C.) but only sparingly soluble in cold water (4.2 grams/100 ml. at 4° C.) They have also been found to be dextrorotary in aqueous solution $(\alpha)_D^{27} = +4°$ (C,5,$H_2O$). Independent investigations have shown pure plicatic acid tetrahydrate to have commercial utility as an antioxidant for edible fats and oils and as an intermediary in the preparation of pharmaceuticals of known therapeutic value.

DETAILED DESCRIPTION

Our invention is conveniently divided into two phases. In the first phase a new composition of matter comprising an essentially pure crystalline methyl ester of plicatic acid is formed. The second phase consists of saponifying the methyl plicatate under carefully controlled alkaline conditions, acidifying with a slight excess of mineral acid and crystallizing pure plicatic acid tetrahydrate.

For the preferred embodiment of our invention the crystalline alkyl plicatate is prepared from the dried solids of a hot aqueous extract of red cedar (*Thuja plicata*) heartwood. A substantial proportion of the solids in such an extract is crude plicatic acid which can be converted to methyl plicatate by the process of the invention.

To prepare the crystalline methyl plicatate the dried crude cedar extract is dissolved in methanol in the presence of a strong mineral acid catalyst. After stirring the solution for several hours, the alkyl plicatate crystallizes and can be filtered out, washed with water to remove inorganic materials and with alcohol to remove colored impurities and dried. In the second phase of the invention the dried pure methyl plicatate is redissolved in an aqueous solution of an alkali metal hydroxide, such as potassium or sodium hydroxide at an elevated temperature of from about 50 to 100° C., and preferably under a non-oxidative atmosphere. The quantity of alkali metal hydroxide in the solution should be sufficient to convert substantially all of the methyl plicatate to the corresponding alkali metal salt and methyl alcohol, that is, at least about 1 mole of the alkali metal hydroxide per mol of the ester. The absence of free oxygen is desired to avoid oxidation of the methy plicatate in the alkaline solution. This is accomplished by use of a vacuum or an inert atmopshere.

After saponification is complete the solution is acidified with a strong mineral acid such as hydrochloric or sulfuric acid and seeded with a crystal of pure plicatic acid tetrahydrate. The crystalline plicatic acid tetrahydrate product that crystallizes from the solution is recovered by filtration or the like, washed with cold water to remove entrained salts and other impurities, and then dried.

The following examples are illustrative but not limitative of the process of our invention.

Examples I and II illustrate the preparation of pure methyl plicatate from crude red cedar (*Thuja plicata*) wood extract.

EXAMPLE I

A hot water extract of western red cedar was spray dried and 50 g. of the dark colored solids so obtained was dissolved in 100 ml. of methanol, 60 ml. of chloroform and 12.5 ml. of concentrated hydrochloric acid. The mixture was stirred while refluxing under a Soxhlet etxractor containing anhydrous sodium sulfate. After 22 hours the reaction mixture was allowed to cool and the product along with inorganic chloride removed by filtration. After washing out colored entrained mother liquor using methanol, the product was washed with water to remove inorganic chloride and carbohydrate materials and finally dried to leave 12.1 g. of slightly off-white product. This material was otherwise identical to colorless crystalline methyl plicatate prepared from crystalline plicatic acid tetrahydrate.

EXAMPLE II

A hot water extract of western red cedar was spray dried and 20 g. of the solids dissolved at room temperature in a mixture of 25 ml. of methanol and 3 ml. of concentrated sulfuric acid. The very dark mixture was then stirerd in a stoppered flask for a period of 2 hours, seeded with methyl plicatate and the stirring continued for a further period of 18 hours to complete the crystallization. Ten ml. of fresh methanol was then added to aid vacuum filtration of the product which was then washed free of colored impurities with a further 6 ml. of methanol. The product was then slurried with 75 ml. of water to dissolve alkali metal sulfates. Vacuum filtration followed by oven drying at 100° C. left 7.15 g. of almost colorless product. The only impurity in this material was found to be 4.8 percent of calcium sulfate.

The melting point of pure methyl plicatate (empirical formula, $C_{21}H_{24}O_{10}$) was found to be 227–230° C. The infra red spectrum in mineral oil showed a characteristic ester band at 1735 cm.$^{-1}$. The ester was optically active when dissolved in dimethylformamide: $(\alpha)_D^{27} = +67.7$ C, 5, DMF).

*Analysis*.—Found (percent): C, 57.58; H, 5.54; $OCH_3$, 21.0. Theory for $C_{21}H_{24}O_{10}$ (percent): C, 57.79; H, 5.54; $OCH_3$, 21.3. The ester is practically insoluble in water, methanol, acetone, ethyl acetate, chloroform and hydrocarbons. The only solvents in which it was found possible to dissolve it were dimethylformamide, dimethylacetamide and dimethylsulphoxide.

Examples III and IV illustrate the preparation of pure plicatic acid tetrahydrate from the foregoing pure methyl plicatate.

EXAMPLE III

Crystalline methyl plicatate (4.52 g., 10.3 mM.) and 7 ml. of 2.96 N sodium hydroxide (20.7 mM.) were mixed in a stoppered Erlenmeyer Flask. The resulting dark colored solution was then allowed to stand at room temperature for 10 minutes whereupon a precipitate of crystalline di-sodium plicatate dihydrate formed. The reaction mixture was warmed to 60° C. to dissolve the salt and then allowed to cool over a period of 30 minutes. The salt again crystallized out. After the addition of 7.5 ml. of 3 N hydrochloric acid (22.5 mM.) the clear acidic solution was seeded and stirred for 30 minutes. After cooling to +4° C. to complete the crystallization, 4.2 g. of plicatic acid tetrahydrate was removed by filtration (82 percent yield).

EXAMPLE IV 43.6 g. of pure crystalline methyl plicatate (100 mM.) was placed in a two-neck flask fitted with a hose-stopcock adaptor and dropping funnel. The flask was then placed under high vacuum and 42 ml. of 2.83 N sodium hydroxide (119 mM.) carefully drawn in via the funnel in such a way that no air was introduced into the reaction vessel. The reaction mixture was then heated to 100° C. for 20 minutes during which time the ester completely dissolved to give a dark colored solution. After cooling to room temperature, 34 ml. of 3.60 N hydrochloric acid (122 mM.) was drawn into the evacuated system to give an acidic reaction mixture. The vacuum was then released and the solution placed in a beaker, seeded, and stirred magnetically. When approximately 5 percent calcium sulfate is present in the starting methyl plicatate (which is the case when the ester is obtained directly from crude cedar extract), this material is immediately removed by filtration of the acidified solution prior to crystallization of the product. Within 10 minutes a semi-solid mass of crystalline plicatic acid tetrahydrate had formed. This was cooled to +5° C. to complete the crystallization, then removed by vacuum filtration, washed free of entrained color bodies using 20 ml. of ice-cold water and finally air dried overnight to give 45.4 g. of slightly off-white plicatic acid tetrahydrate crystals. This represents a theoretical yield of 92 percent.

The air-dried crystalline plicatic acid tetrahydrate products of the foregoing examples were all the same and melted at 176° C. (Leitz hot stage melting point apparatus) with no visible evidence of decomposition below the indicated melting point. (When the melting points were determined in a capillary tube, however, evolution of water was observed at 92–94° C.). That the air dried products were the tetrahydrated form of plicatic acid was confirmed by several independent methods. These included the following: (a) Drying the material at 100° C. under high vacuum resulted in considerable loss of weight (10 to 15 percent). (b) The equivalent weight by potentiometric titration with a base was found to be 496, which indicates 4.1 molecules of hydrated water. (c) A Karl Fischer water determination showed the presence of 14.48 percent by weight water. The theoretical percentage of water for plicatic acid tetrahydrate is 14.6 percent. (d) A quantitative paper chromatogram showed that the material contained 85.2 percent of anhydrous plicatic acid. The theoretical percentage of anhydrous plicatic acid in a tetrahydrate is 85.5 percent. From these data it is clear that crystalline plicatic acid tetrahydrate has been isolated.

We claim:
1. Crystalline plicatic acid tetrahydrate having a melting point of 176° C., being stable to heat and light up to said melting point, the dextrorotation of the aqueous solution of the crystals being $(\alpha)_D^{27}=+4°$ (C., 5, H$_2$O), and having the structural formula
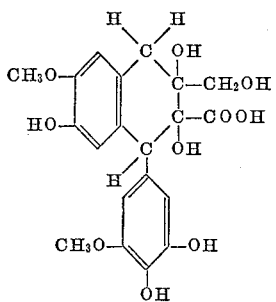
2. Crystalline methyl plicatate.
References Cited
Gardner, Canadian Journal of Chemistry 37, p. 1703–9 (1959).
Noller, Chemistry of Org. Cmpds. (1965), p. 181.
LORRAINE A. WEINBERGER, Primary Examiner
J. F. TERAPANE, Assistant Examiner
U.S. Cl. X.R.
260—520; 99—163